(No Model.)

W. L. CHURCH.
APPARATUS FOR MAKING ICE.

No. 529,344.  Patented Nov. 13, 1894.

WITNESSES:
M. W. Jackson
A. D. Harrison

INVENTOR
Wm Lee Church
by Wright Brown Crosley
Attys

UNITED STATES PATENT OFFICE.

WILLIAM LEE CHURCH, OF NEWTON, MASSACHUSETTS, ASSIGNOR TO THE WESTINGHOUSE, CHURCH, KERR & COMPANY, OF JERSEY CITY, NEW JERSEY, AND NEW YORK, N. Y.

APPARATUS FOR MAKING ICE.

SPECIFICATION forming part of Letters Patent No. 529,344, dated November 13, 1894.

Application filed December 18, 1893. Serial No. 493,987. (No model.)

*To all whom it may concern:*

Be it known that I, WILLIAM LEE CHURCH, of Newton, in the county of Middlesex and State of Massachusetts, have invented certain new and useful Improvements in Apparatus for Making Ice, of which the following is a specification.

This invention relates to the manufacture of ice in horizontal pans which are subjected to the action of a freezing agent in such manner that the freezing action takes place wholly or mainly from the bottom of the pan upwardly, so that the air contained in the water is expelled upwardly as the freezing progresses.

The invention relates particularly to the removal of the air-bubbles that may accumulate on the top surface of the cake, by a progressive movement of the superimposed water and of the actuating device during the freezing operation, said movement brushing or sweeping the surface of the cake and thus removing the bubbles.

The invention consists in the combination with an ice-forming pan and means below the same for freezing upwardly from the bottom of the pan, of a vertically movable water-circulating device adapted to rotate in a substantially horizontal plane in said pan for the purpose of brushing or sweeping the surface of the forming piece of ice, or to maintain a brushing or sweeping movement of water therein, said device being displaceable by the accumulation of ice, so that it rises with the surface of the cake and is kept in operative position thereon.

The invention also consists in certain incidental improvements, all of which I will now proceed to describe and claim.

Figure 1:
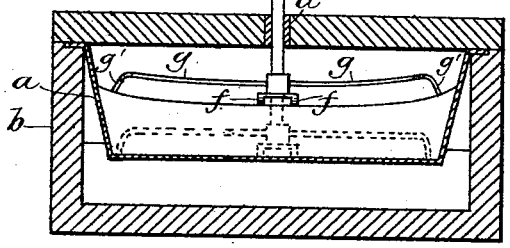
Figure 7:
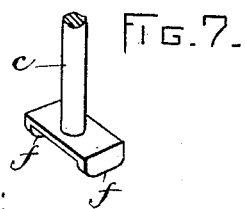
Figure 8:
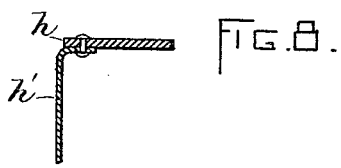

Of the accompanying drawings, forming a part of this specification: Figure 1 represents a partial sectional view and partial side elevation of an ice-making apparatus embodying my invention. Figs. 2, 3, 4 and 5 represent similar views, showing different forms in which my invention may be embodied. Fig. 6 represents a top view, showing the construction represented in Fig. 5. Fig. 7 represents a perspective view of the preferred form and arrangement of the runners that move upon and are raised by the ice. Fig. 8 represents a section in line 8—8 of Fig. 2.

The same letters of reference indicate the same parts in all the figures.

In the drawings: $a$ represents an ice-forming pan, which is much longer and wider than its depth, and comprises a substantially horital bottom and suitable sides to confine a charge of water. The pan, when in use, may be supported over a suitable casing, $b$, adapted to contain a refrigerating agent, which acts principally upon the bottom of the pan, so that the freezing action is wholly or mainly upward from the bottom, and the top surface of the cake is kept substantially level.

In carrying out my invention, which relates mainly to a continuous sweeping or brushing of the surface of the ice during the freezing operation, to remove air-bubbles expelled from the ice by the upwardly freezing action, I provide a vertically-movable rotating brush or water-circulating device, which is inserted in the pan, and is adapted to be raised or displaced by the accumulation of ice rising from the bottom of the pan, and is also adapted either to continually brush the surface of the forming cake of ice, or to maintain a continuous rotary circulation of the water over the surface of the ice, the said device being kept in an operative position on the surface of the cake throughout the entire operation.

The construction of the water-circulating device may be variously modified. I have shown several constructions, each including a vertical shaft, $c$, which is fitted to rotate and move vertically in a bearing, $d$, formed in the cover, $e$, of the pan, and is provided with means, such as a pulley, $c'$, and a driving-belt thereon, whereby it may be rotated. To said shaft are affixed substantially horizontal wings or blades, formed either to continuously brush the surface of the forming cake of ice, or to act on the water in the pan when in operation, and cause a circular movement of the water. The shaft and its wings are adapted to rise with or be forced upwardly by the accumulation of ice, so that the wings are at all times above the surface of the ice and in position to move over the same.

In Figs. 1, 2, 3 and 4, I show the shaft provided with runners *f f* at its lower end (shown more clearly in the detached sketch Fig. 7), adapted to rest on the surface of the accumulation of ice, at two points at some distance from each other, and from the center of the shaft. As the shaft slowly rotates, the runners are not frozen fast as they would be if they were stationary, nor do they wear a hole in the cake as would be the case if the end of the shaft rested directly on the ice, but the two runners in moving continually encounter a new and freshly frozen surface of ice, thereby riding upon and rising with the cake of ice as it increases in thickness in freezing. In the construction shown in Figs. 5 and 6, the runners are constructed as parts of the blades as hereinafter described.

In Fig. 1, the shaft is shown as provided with wings *g g* which are or may be flexible, so that the wings can conform to any inequalities in the surface of the cake, caused by more rapid freezing near the sides of the pan, the cake being liable to be somewhat thicker immediately along the sides than over the remaining portion of the pan, as shown in Fig. 1. In this case the wings may be made of a strip of sheet metal attached centrally to the shaft and bent downwardly at its outer ends to form feet *g' g'* adapted to bear on the surface of the ice, the strip being arranged to move edgewise through the water. At the beginning of the operation, the flexible wings occupy the position shown in dotted lines in Fig. 1, and as the thickness of the cake increases the whole device rises, and the outer portions of the wings bend upwardly to accommodate any uneven thickness, as shown in full lines. The wings are in this case made of any suitable flexible material, or they may be comparatively stiff, and hinged at their inner ends to the shaft so that they may swing vertically.

Figure 2:
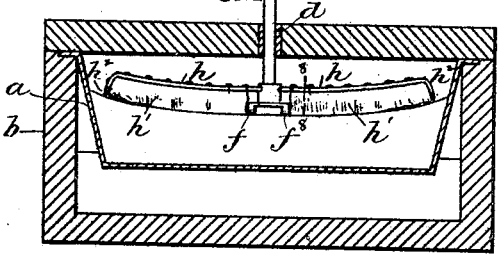

In Fig. 2, I show the wings formed as shown in Fig. 1, and provided with flexible strips or brushes, *h'*, of canvas, rubber or other suitable material attached to said arms, so that the lower edge of the flexible brushes may continuously brush the surface of the forming cake of ice, the brushes being preferably riveted to the wings as shown in Fig. 8.

Figure 3:
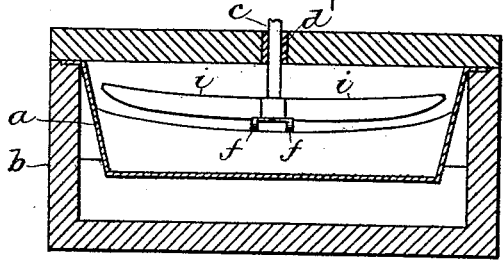

In Fig. 3, I show the wings composed of stiff blades *i*, rigidly attached to the shaft.

Figure 4:
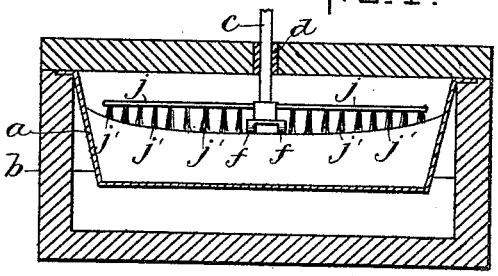

In Fig. 4, I show the wings composed of stiff arms *j j* rigidly attached to the shaft and brushes *j' j'*, which may be of any suitable brush material, attached to said arms, and adapted to continuously brush the surface of the forming cake of ice.

Figure 5:
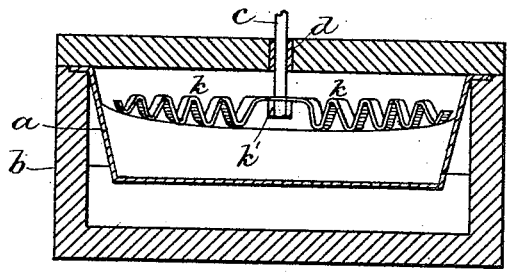
Figure 6:

The wings, *k*, shown in Figs. 5 and 6, are composed of flexible strips, preferably of sheet metal; or, if desired, one continuous strip extending across the shaft and secured thereto by a nut, *k'*. Each strip has a series of bends, the lower portions of which constitute feet or runners adapted to bear on and rise with the accumulation of ice, so that the runners *f f* are not required. The bends are preferably arranged obliquely, as shown in Fig. 6, so that their sides act as blades to give lateral motion to the water in which the wings or strips *k* are revolved.

The wings shown in Figs. 1 and 3 cause a brushing or sweeping action wholly by the movement of the water, while the wings shown in Figs. 2, 4, 5 and 6 act directly on the ice in addition to circulating the water.

I do not limit myself to pans, but where the word "pan" is used I refer equally to any receptacle in which the freezing proceeds substantially from the bottom only, the surface of the ice being thereby kept substantially level; my invention relating principally to the production of a continuous rotary sweeping movement of the unfrozen water in a receptacle of this description.

I claim—

1. The combination with an ice-forming pan, and means below the pan for freezing water therein wholly or mainly from the bottom of the pan, of a rotary brushing or water-circulating device having a substantially vertical axis of rotation and extended laterally from said axis over the bottom of the pan, said device being vertically displaceable by the accumulation of ice.

2. The combination with an ice-forming pan, and means below the pan for freezing water therein wholly or mainly from the bottom of the pan, of a vertically-movable rotary shaft having arms or wings adapted to move through the water in the pan, said shaft and its wings being vertically displaceable by the ice forming in the pan.

3. The combination with an ice-forming pan, of a vertically-movable rotary shaft, having flexible blades or wings adapted to move over and conform to the surface of an accumulation of ice in said pan.

4. The combination with an ice-forming pan, and means below the pan for freezing water therein wholly or mainly from the bottom of the pan, of a rotary water-circulating device having runners adapted to be moved over the forming surface of the ice by the rotation of the said device, and also to be raised by the ice.

5. The combination with an ice-forming pan, and means below the pan for freezing water therein wholly or mainly from the bottom of the pan, of a vertically-movable rotary shaft having runners formed to bear on and rise with an accumulation of ice in said pan, and blades or wings adapted to move the water in said pan.

In testimony whereof I have signed my name to this specification, in the presence of two subscribing witnesses, this 1st day of December, A. D. 1893.

WILLIAM LEE CHURCH.

Witnesses:
SIDNEY A. REEVE,
FRANCIS BLOSSOM.